United States Patent [19]
Bauer et al.

[11] 3,995,884
[45] Dec. 7, 1976

[54] PASSIVE SAFETY DEVICE FOR VEHICLES

[75] Inventors: Andreas Bauer; Erwin Blüggel, both of Fallersleben, Germany

[73] Assignee: Volkswagenwerk Aktiengesellschaft, Wolfsburg, Germany

[22] Filed: Nov. 26, 1975

[21] Appl. No.: 635,391

[30] Foreign Application Priority Data
Dec. 11, 1974  Germany ................... 2458549

[52] U.S. Cl. .................. 280/745; 297/385
[51] Int. Cl.² ........................... B60R 21/02
[58] Field of Search ......... 280/744, 745, 746, 747; 180/82 C; 297/385

[56] References Cited
UNITED STATES PATENTS

| | | | |
|---|---|---|---|
| 3,583,726 | 6/1971 | Lindblad | 280/745 |
| 3,770,078 | 11/1973 | Keppel | 280/745 |
| 3,781,034 | 12/1973 | Botnick | 280/745 |

*Primary Examiner*—Robert R. Song
*Assistant Examiner*—R. Schrecengost
*Attorney, Agent, or Firm*—Brumbaugh, Graves, Donohue & Raymond

[57] ABSTRACT

An improved passive safety device for a vehicle has a safety belt anchor point, movably maintained in a guide extending diagonally over a door panel, which can be moved such that an associated safety belt is applied about a vehicle occupant when the door is closed and lifted off when the door is open, and the improvement comprising an arm rest on the door which can be adjusted in conjunction with movement of the anchor point so that it does not hinder movement of the anchor point in the guide.

8 Claims, 1 Drawing Figure

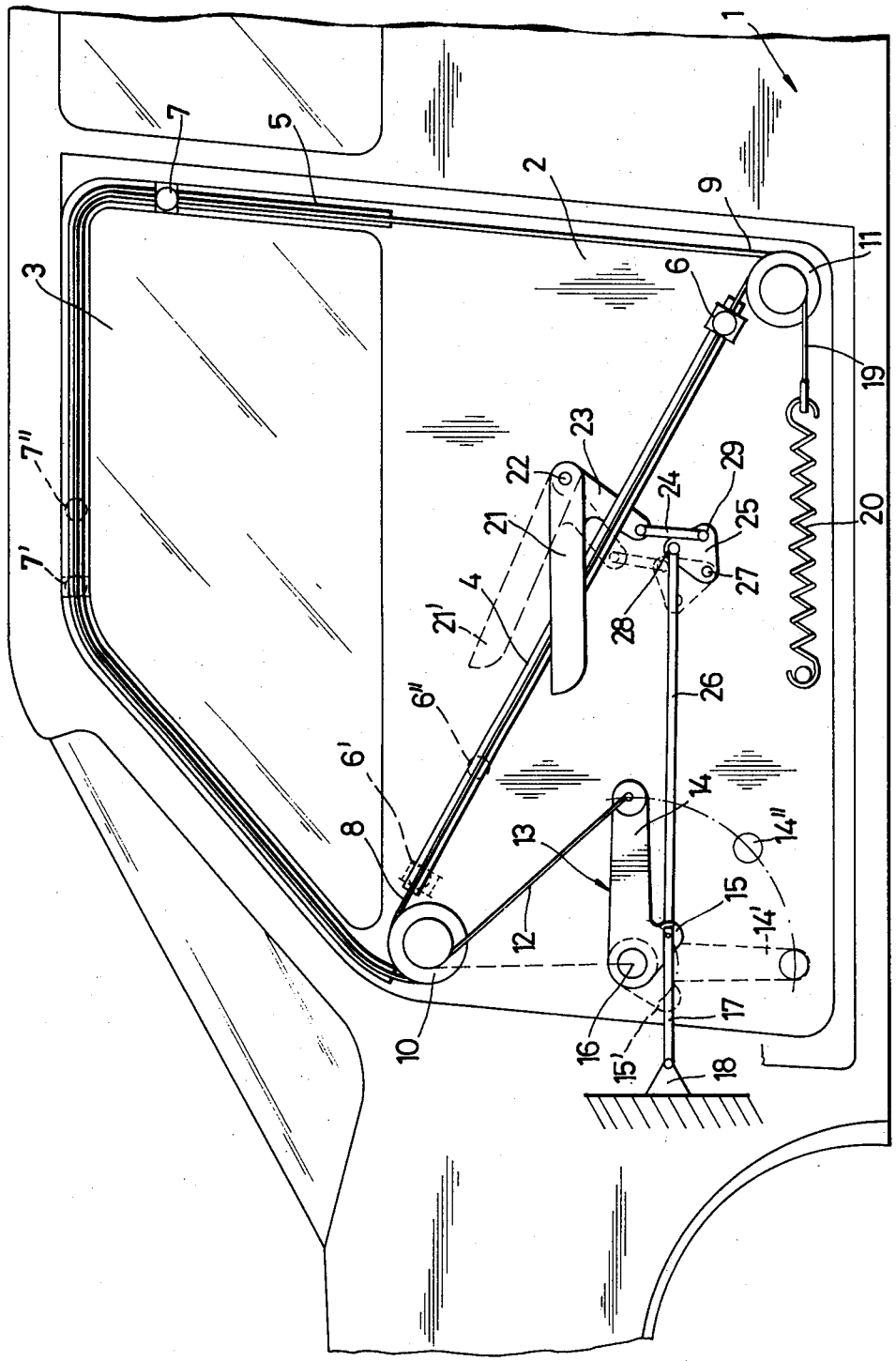

ure link and an angle lever having two lever arms pivotably mounted on the door in the vicinity of the door hinges. A first lever arm is connected to the power transmission linkage, and the second is connected through linking elements to the belt anchor

PASSIVE SAFETY DEVICE FOR VEHICLES

BACKGROUND OF THE INVENTION

Passive safety devices are known which have a safety belt fastened at one end to an anchor point maintained in a guide extending diagonally across the door panel, as described in U.S. Pat. No. 3,583,726, for example. Characteristically, the anchor point in this type of device is moved by an actuating mechanism which is controlled in response to movement of the door so as to apply the safety belt about the vehicle occupant when the door is closed and lift it off when the door is opened.

It can be readily appreciated, however, that if the customary arm rest, extending horizontally and projecting toward the vehicle interior, were attached to the door, the movement of the belt anchor point in the diagonal guide would be obstructed or impaired. It is therefore a principal purpose of invention to provide, in conjunction with a passive safety device of the kind described above, an arm rest on the door which is passively adjustable such that it will not hinder movement of the belt anchor point in the guide.

SUMMARY OF THE INVENTION

In accordance with the invention, an improved passive safety device for a vehicle, such as an automobile, has at least one safety belt anchor point movably maintained in a guide extending substantially diagonally over a door panel and moving means for moving the anchor point in the guide such that the anchor point will assume a restraining position in which a safety belt associated therewith is applied about the body of a vehicle occupant when the door is closed and will assume a releasing position in which the safety belt is lifted from the vehicle occupant when the door is open. The improvement comprises an arm rest adjustably mounted on the door and adjusting means connecting the arm rest to the moving means such that, upon operation of the moving means, the arm rest is adjusted in conjunction with movement of the safety belt anchor point, between a first position in which the arm rest is substantially horizontal with respect to the door and a second position in which it does not hinder movement of the anchor point in the guide.

In a preferred embodiment of the invention, the arm rest is pivotably mounted to the vehicle door, and the moving means is operated in response to pivotal movement of the door. In practice, it is of special advantage if the moving means is connected with the arm rest adjusting means such that, in the proximity of the horizontal rest position of the arm rest when the door is closed, a small pivotal movement of the door results in a relatively large pivotal movement of the arm rest. In this manner, the arm rest is very rapidly moved, preferably swung, from its horizontal position to a pivoted position clearing the guide so that the belt anchor point can be displaced in the guide to its releasing position without impediment or difficulty.

The moving means in the preferred embodiment includes a torque or power transmission linkage, articulated on the vehicle body in the region of the hinges for the vehicle door, and an angle lever having two lever arms pivotably mounted on the door in the vicinity of the door hinges. A first lever arm is connected to the power transmission linkage, and the second is connected through linking elements to the belt anchor point in the guide. By this arrangement, pivotal movement of the door results in the transmission of torque to pivot the angle lever and move the anchor point in the guide. Further, in the preferred embodiment, the arm rest adjusting means includes a shift plate pivotably mounted to the door below the arm rest, a horizontal linkage rod connecting one end of the shift plate with the second lever arm of the angle lever, and a vertical linkage rod connecting another end of the shift plate with the pivotable arm rest.

It is advantageous in the invention to connect the horizontal linkage rod with the shift plate such that the horizontal displacement path of the rod results in a large angle of traverse for the shift plate. It is similarly advantageous that the vertical linkage rod functions with the shift plate such that, when the shift plate is pivoted out of the position corresponding to the rest position of the arm rest when the door is closed, the pivotal movement initially produces a large vertical displacement of the rod, and, towards the end of the pivotal movement of the shift plate, relatively smaller vertical displacement of the rod. By this arrangement, the desired adjustment characteristics of the arm rest is attained, in that, at relatively small opening angles of the vehicle door, the arm rest is swung clear of the guide to permit the unobstructed displacement of the belt anchor point to its releasing position.

Further characteristics and essential advantages of the invention are described in greater detail below in conjunction with the drawing, which shows in schematic side view a door of a vehicle equipped with the improved passive safety device in accordance with the preferred embodiment of the invention.

DETAILED DESCRIPTION OF THE DRAWING

In the drawing, a door 2 of an automobile 1 includes a window portion 3 and a lower panel portion equipped with a guide 4 extending diagonally across the door panel. A safety belt anchor point for an associated lap belt (not shown) is maintained in the guide 4 and is displaceable between a lower position 6, corresponding to a restraining position in which the associated lap belt is applied about the waist of a vehicle occupant in an associated vehicle seat (not shown) and in which the anchor point is held in place by means of a locking device (not shown), and an upper position 6', corresponding to a releasing position in which the belt is lifted from the vehicle occupant. The door is similarly equipped with an upper guide 5 displaceably maintaining an anchor point 7 for an associated shoulder belt of a conventional three-point belt system, both the shoulder and lap belts being fastened on the opposite side of the vehicle seat from the above anchor points by a third anchor point to the floor near the centerline of the vehicle (not shown in the drawing).

The displacement of the safety belt anchor points 6 and 7 in the guides 4 and 5, which may consist of slotted tubes, for example, is accomplished through cable lines 8 and 9, the ends of which are wound over the larger diameter reels of differential rolls 10 and 11, respectively. The first differential roll 10 is located in the forward upper region of the vehicle door 2 and is connected to the longer arm 14 of an angle lever 13 by means of a cable line 12 wound over its smaller diameter in a direction counter to the winding of cable line 8. The angle lever 13 pivots about point 16 located approximately vertically below the differential roll 10, and is actuated by a torque or power transmission linkage 17 acting on the shorter arm 15 of the angle lever. The power transmission linkage is articulated on the vehicle body at point 18. Pivoting of the angle lever 13 is obtained by means of the power transmission linkage 17, designed as a stop for the door, for example, being coupled to the vehicle body a distance from the pivot axis of the door such that, as seen from the side view, there occurs on opening the door 2 an ostensible shortening of the length of the power transmission linkage 17, due to the resultant relative displacement of the door away from the articulation point 18 into the plane of the drawing. The second differential roll 11 is rotatably mounted in the lower rear zone of the vehicle door 2, and likewise has a cable line 19 wound over its smaller diameter in a direction counter to that of the cable line 9. The cable line 19 is biased by a restoring spring 20.

In the drawing, the solid lines indicate the elements of the passive safety device in rest positions corresponding to restraining positions for the associated safety belts, whereas the broken lines indicate release positions. When the vehicle door 2 is opened, pivoting of the angle lever 13 about its axis 16 due to the action of the power transmission linkage 17 results in counterclockwise rotation of the differential roll 10 due to unwinding of the cable line 12. Consequently, the cable lines 8 and 9, which are maintained either on a common winding reel or on two, side-by-side, rigidly connected reels, are wound up on the cable roll 10, and the safety belt anchor points 6 and 7 are displaced in the guides 4 and 5 toward the release positions indicated by 6' and 7', respectively. Simultaneously, the cable lines 8 and 9 are unwound at their other ends from the differential roll 11, designed in the same manner as the roll 10, while the cable line 19 is wound onto the smaller diameter reel of the differential roll 11, thus tensioning the restoring spring 20.

When the vehicle door 2 is closed, an arm rest 21 is horizontally aligned in its rest position, as shown by the solid lines, and, as viewed from the vehicle interior, extends over the guide 4 for the lower safety belt anchor point 6. In order to avoid obstructing displacement of the anchor point 6 in the guide, the arm rest 21 is pivoted about its fulcrum point 22 when the door is opened in such a manner that, at the instant the belt anchor point 6 arrives in the zone of the arm rest, the arm rest has already substantially cleared the guide 4.

Adjustment of the arm rest 21 from its rest position into the release position, designated by 21', is obtained by means of an adjustment mechanism, located behind the plane of the guide 4 as viewed from the vehicle interior, which includes a shift plate 25, pivotably mounted to the door at pivot point 27, and two linkage rods 26 and 24. The first linkage rod 26 is aligned substantially horizontally and connects the shift plate 25 at point 28 with the shorter arm 15 of the angle lever 13. The second linkage rod 24 is aligned substantially vertically and connects the shift plate 25 at point 29 with a lever arm 23 rigidly connected to the arm rest 21.

As it is desireable in practice to have the arm rest 21 swung clear of the guide at a relatively small opening angle of the vehicle door 2, the connecting point 29 for the vertical linkage rod 24 is arranged such that, starting from the rest position when the vehicle door is closed, it executes a large vertical displacement movement even when the opening angle of the vehicle door is small. This is obtained by positioning the shift plate 25 such that the connecting point 29 in the rest position is aligned approximately horizontally with respect to the shift plate pivot point 27. Similarly, as it is advantageous to have a large angle of traverse for the shift plate 25 associated with the displacement of the horizontal linkage rod 26, the connecting point 28 for the rod 26 is located on the shift plate 25 such that in the rest position it is aligned approximately vertically of the pivot point 27. In principle, an even larger pivot angle for the shift plate 25 could be attained for the same axial displacement of the linkage rod 26 if the rod were instead hinged to the connecting point 29.

Due to the design of the adjustment mechanism in accordance with the invention, the arm rest 21 is rapidly pivoted when the vehicle door is opened from the rest position, indicated by solid lines, to the release positon 21', indicated in broken lines, such that the belt anchor point 6 can be displaced in the guide 4 to assume its release position 6' without encountering any obstacle. In the drawing, the belt anchor points are also respectively shown in positions 6'' and 7'' corresponding to the position 14'' of the longer arm of the angle lever 13 when the door is half-opened. It is thus apparent that displacement of the belt anchor points is initially large for relatively small opening angles of the door, and degressively smaller as the opening angles increase. Thus, the rapid pivoting of the arm rest 21 cooperates in function with displacement of the belt anchor points.

It will be understood that the above described embodiment is merely exemplary and that persons skilled in the art may make variations and modifications without departing from the spirit and scope of the invention. For example, the arm rest adjustment mechanism and the anchor point displacement mechanism could be power operated and activated in conjunction with unlocking the door locking mechanism or pulling the door handle to unlatch the door. All such modifications and variations are intended to be within the scope or the invention as defined in the appended claims.

We claim:

1. An improved passive safety device for a vehicle, such as an automobile, having at least one safety belt anchor point movably maintained in a guide extending substantially diagonally over a door panel and driving means for moving the anchor point in the guide such that the anchor point will assume a restraining position in which a safety belt associated therewith is applied about the body of a vehicle occupant when the door is closed and will assume a releasing position in which the safety belt is lifted from the vehicle occupant when the door is open, wherein the improvement comprises an arm rest movably mounted on the door and moving means operatively connecting the arm rest to the driving means for selectively moving said arm rest between first and second positions such that, upon operation of the driving means, the arm rest is moved in conjunction with movement of the safety belt anchor point, between the first position in which the arm rest is substantially horizontal with respect to the door when the anchor point is in its restraining position and the second position in which it does not hinder movement of the anchor point in the guide when the anchor point is moved to its releasing position.

2. The safety device described in claim 1, wherein the means for driving the anchor point in the guide is operated in response to pivotal movement of the door.

3. The safety device described in claim 1, wherein the arm rest is pivotably mounted to the vehicle door.

4. The safety device described in claim 2, wherein the arm rest moving means connects the driving means with the arm rest in such a manner that, in proximity of a position corresponding to the first position of the arm rest when the vehicle door is closed, a small displacement movement of the vehicle door results in a relatively large displacement movement of the arm rest.

5. The safety device described in claim 2, wherein the driving means includes in the region of hinges for the vehicle door a power transmission element articulated on the vehicle body and an angle lever having two arms pivotably mounted to the door, the first one of said arms being connected to the power transmission element and the second arm being connected by way of linking elements to the safety belt anchor point, and wherein the arm rest moving means includes a shift plate pivotably mounted to the door, a first linkage rod aligned essentially horizontally and connecting an end of the shift plate with the second arm of the angle lever, and a second linkage rod aligned essentially vertically and connecting another end of the shift plate with the arm rest.

6. The safety device described in claim 5, wherein the first linkage rod connects the angle lever of the driving means with the shift plate such that a small horizontal displacement movement of the rod produces a relatively large pivotal movement of the plate.

7. The safety device described in claim 5, wherein the second linkage rod connects the shift plate with the arm rest such that, from a position corresponding to the first position of the arm rest when the door is closed, pivotal movement of the shift plate results initially in a relatively large vertical displacement of the rod and, towards the end of the pivotal movement, in progressively smaller vertical displacement of the rod.

8. An improved passive safety device for a vehicle, such as an automobile, having at least one safety belt anchor point movably maintained in a guide extending substantially diagonally over a door panel and driving means operated in response to pivotal movement of the door for moving the anchor point between a restraining position in the guide at a lower corner of the door panel adjacent an associated vehicle seat when the door is closed, whereby an associated safety belt anchored thereto is applied about the body of a passenger seated in the vehicle seat, and a releasing position in the guide at an upper corner of the door panel diagonally across from the restraining position when the door is open, whereby the safety belt is lifted from the body of the passenger, wherein the improvement comprises an arm rest pivotably mounted on the door and moving means operatively connecting the arm rest to the driving means for selectively moving said arm rest between first and second positions; such that, upon operation of the driving means, the arm rest is pivoted in conjunction with movement of the safety belt anchor point, between the first position wherein the arm rest is in a substantially horizontal rest position in which the arm rest extends across a portion of the guide when the anchor point is in its restraining position and a second position wherein the arm rest is in a pivoted position in which it does not hinder movement of the anchor point in the guide when the anchor point is moved to its releasing position.

* * * * *